United States Patent
Shimizu et al.

(10) Patent No.: US 8,194,309 B2
(45) Date of Patent: Jun. 5, 2012

(54) OPTICAL AMPLIFIER USING DELAYED PHASE MATCHING FIBER

(75) Inventors: Takashi Shimizu, Kawasaki (JP);
Shinya Inagaki, Kawasaki (JP);
Tomoaki Takeyama, Kawasaki (JP);
Keiko Sasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 929 days.

(21) Appl. No.: 11/586,604

(22) Filed: Oct. 26, 2006

(65) Prior Publication Data

US 2007/0041084 A1    Feb. 22, 2007

Related U.S. Application Data

(60) Division of application No. 11/094,720, which is a continuation of application No. PCT/JP03/01949, filed on Feb. 21, 2003.

(51) Int. Cl.
*H04B 10/17* (2006.01)
*H04B 10/12* (2006.01)

(52) U.S. Cl. ............. 359/337.4; 359/337.3; 359/341.3

(58) Field of Classification Search ........... 359/337.4, 359/337.3, 341.3
See application file for complete search history.

(56) References Cited

U.S. PATENT DOCUMENTS

| | | | |
|---|---|---|---|
| 5,138,621 A | | 8/1992 | Goto et al. |
| 5,508,842 A | | 4/1996 | Takeda et al. |
| 5,742,427 A | * | 4/1998 | Kakui et al. ............. 359/337.4 |
| 5,799,125 A | | 8/1998 | Inagaki et al. |
| 6,222,670 B1 | | 4/2001 | Ryu et al. |
| 6,233,092 B1 | | 5/2001 | Flood et al. |
| 6,266,180 B1 | * | 7/2001 | Inagaki et al. ............. 359/337 |
| 6,377,394 B1 | | 4/2002 | Drake et al. |
| 6,556,756 B2 | | 4/2003 | Bhagavatula |
| 6,621,622 B2 | | 9/2003 | Krummrich |
| 6,633,429 B2 | | 10/2003 | Kinoshita et al. |
| 6,687,046 B2 | | 2/2004 | Leplingard et al. |
| 6,687,439 B1 | | 2/2004 | Endo et al. |
| 2001/0019651 A1 | | 9/2001 | Kato |
| 2002/0001124 A1 | | 1/2002 | Kinoshita et al. |
| 2002/0033996 A1 | | 3/2002 | Endo et al. |
| 2002/0159136 A1 | | 10/2002 | Lu et al. |

(Continued)

FOREIGN PATENT DOCUMENTS

EP    0 454 865 A1    11/1991

(Continued)

OTHER PUBLICATIONS

Myslinski et al. Effects of Concentration on the Performance of Erbium-Doped Fiber Amplifiers. Journal of Lightwave Technology. vol. 15. No. 1. Jan. 1997.*

(Continued)

*Primary Examiner* — Eric Bolda
(74) *Attorney, Agent, or Firm* — Staas & Halsey LLP

(57) ABSTRACT

The present invention has an object to provide an optical amplifier capable of realizing a good response characteristic in a wide frequency band, even when a population inversion state is formed by a pumping light supplied to an optical amplification medium and an ASE light generated in the optical amplification medium. To this end, in the optical amplifier according to the present invention, a delayed phase matching fiber in which a first fiber whose response speed is relatively low is arranged on the input side and a second fiber whose response speed is relatively high is arranged on the output side, is used as the optical amplification medium doped with a rare-earth element.

6 Claims, 5 Drawing Sheets

U.S. PATENT DOCUMENTS

2003/0039026 A1　　2/2003　Nishihara et al.

FOREIGN PATENT DOCUMENTS

| | | |
|---|---|---|
| JP | 03-048225 | 3/1991 |
| JP | 4-65175 | 3/1992 |
| JP | 10-79543 | 3/1998 |
| JP | 2842481 | 10/1998 |
| JP | 2842481 | 1/1999 |
| JP | 2000-077755 | 3/2000 |
| JP | 2000-252558 | 9/2000 |
| JP | 2001-313433 | 11/2001 |
| JP | 2002-252399 | 9/2002 |
| JP | 2002-528901 | 9/2002 |
| JP | 2002-359419 | 12/2002 |
| JP | 2003-008114 | 1/2003 |
| JP | 2003-051632 | 2/2003 |
| WO | WO 00/51213 | 8/2000 |

OTHER PUBLICATIONS

Pfeiffer et al. Analytical Gain Equation for Erbium-Doped Fiber Amplifiers Including Mode Field Profiles and Dopant Distribution. IEEE Photonics Technology Letters. vol. 4. No. 5. May 1992.*

Japanese Office Action issued on May 26, 2009 in corresponding Japanese Patent Application 2004-563494.

H. Sawada, et al., "Broadband and Gain-flattened Erbiumdoped Fiber Amplifier for L-band Amplification," Mitsubishi Cable Industries Times, pp. 45-48.

M.A. Mahdi, et al., "Gain Enhanced L-Band $Er^{3+}$-Doped Fiber Amplifier Utilizing Unwanted Backward ASE," IEEE Photonics Technology Letters, vol. 13, No. 10, pp. 1067-1069.

H.S. Chung, et al., "Low noise, high efficiency L-band EDFA with 980nm pumping," Electronics Letters, vol. 35, No. 13, pp. 1099-1100.

R. D. Muro, "Broad-band Amplification Using a Novel Amplifier Topology," IEEE Photonics Technology Letters, vol. 13, No. 10, pp. 1073-1075.

M. Karasek, et al., "Serial Topology of Wide-Band Erbium-Doped Fiber Amplification for WDM Applications," IEEE Photonics Technology Letters, vol. 13, No. 9, pp. 939-941.

A. Buxens, et al., "Gain flattened L-band EDFA based on upgraded C-band EDFA using forward ASA pumping in an EDF section," vol. 36, No. 9, pp. 821-823.

Capmany et al. Theoretical and Experimental Characterization of a Double Coupler Fiber-Optic Delay Line Filter Employing an Optical Amplifier. LEOS'94 Conference Proceedings. vol. 1 Oct. 31, 1994-Nov. 3, 1004, pp. 248-250.

* cited by examiner

BASIC CONFIGURATION OF CONVENTIONAL EDFA

PHASE CHARACTERISTIC OF CONVENTIONAL EDFA

US 8,194,309 B2

OPTICAL AMPLIFIER USING DELAYED PHASE MATCHING FIBER

CROSS-REFERENCE TO RELATED APPLICATIONS

This application is a divisional of Ser. No. 11/094,720 filed Mar. 31, 2005 now U.S. Pat. No. 7,136,219, which is a continuation of PCT/JP03/01949, filed on Feb. 21, 2003, the disclosure of which is incorporated here in by reference.

BACKGROUND OF THE INVENTION

1. Field of the Invention

The present invention relates to an optical amplifier enabling the large capacity and the long distance of an optical communication system, and in particular, to an optical amplifier in which a population inversion state is formed by a pumping light supplied to an optical amplification medium and an ASE light generated in the optical amplification medium.

2. Description of the Related Art

In recent years, demands of information have been remarkably increased with the development of Internet technology. In a trunk optical transmission system to which information capacity is collected, the larger capacity, the flexible network formation and the like have been demanded. A wavelength division multiplexing (WDM) transmission system is the most effective means at present stage, as the technology for coping with such a system demand, and the commercialization thereof is now progressed.

For realizing the above wavelength division multiplexing transmission system, an optical amplifier which amplifies optical signals using an optical fiber doped with a rare-earth element, is one of key components, since this optical amplifier can collectively amplifies a wavelength division multiplexed signal light utilizing a wide gain band thereof. As such an optical amplifier, an erbium (Er)-doped fiber optical amplifier (EDFA) is typical.

In recent years, it has been known that the EDFA not only has an amplification band corresponding to 1530 to 1565 nm wavelength band, so-called C-band (conventional wavelength band), which has been mainstream, but also contains 1570 to 1605 nm wavelength band, so-called L band (long wavelength band) as the amplification band thereof. Therefore, in the existing EDFA system, it is possible to amplify a WDM signal light in which optical signals of about 200 waves are arranged in a band combining the C-band and the L-band (refer to Japanese Unexamined Patent Publication No. 2000-77755, Japanese National Phase Patent Publication No. 2002-528901 and the literature "Review of wideband gain flattening EDFA for L-Band amplification", Sawada et al., Mitsubishi Cable Industries Review, Vol. 96, pp. 45-48).

FIG. 7 is a block diagram showing a basic configuration of a conventional EDFA.

The conventional EDFA shown in FIG. 7 comprises: an erbium-doped fiber (EDF) 101; a pumping semiconductor laser (LD) 102 and a WDM coupler 103 which supply a pumping light Lp to the EDF 101; and optical isolators 104 and 105 arranged on both end portions between an input terminal IN and an output terminal OUT. In this configuration example, a forward pumping configuration is applied, so that the pumping light Lp is supplied from one end of the input side of the EDF 101, and a signal light Ls and the pumping light Lp are propagated to the same direction, thereby obtaining a good noise characteristic (NF). Further, in the conventional EDFA, there are frequently applied a configuration for feedback controlling a drive current to be given to the pumping semiconductor laser 102 based on a monitoring result in an input and output power monitor (not shown in the figure, here), so that an output power level or a gain becomes constant.

It has been known that, in the case where a signal light in the L-band is amplified by the conventional EDFA having the above basic configuration, an optical amplification operation of the EDFA shows a frequency response characteristic which is changed in two-steps, as shown in FIG. 8 and FIG. 9 for example. This frequency response characteristic of two-steps occurs caused by the absorption process of pumping light for when the EDF 101 is brought into a population inversion state.

Namely, the EDF 101 is brought into the population inversion state by the process in which the pumping light Lp supplied from the pumping light source 102 to the EDF 101 via the WDM coupler 103 is directly absorbed, and the process in which an amplified spontaneous emission (ASE) light generated in the EDF 101 is reabsorbed as the pumping light. Since a delay occurs in an optical amplification response characteristic obtained based on the re-absorption of the ASE light, compared with an optical amplification response characteristic obtained based on the absorption of the pumping light Lp, an optical amplification response characteristic in the entire EDF 101 is changed in two-steps. FIG. 8 shows one example specifically representing this optical amplification response characteristic in which a modulation frequency of pumping LD is in the horizontal axis and a phase is in the vertical axis. A phase characteristic in FIG. 8 represents, as a phase difference, a time difference between timing at which the power of the signal light Ls is changed and the time when the power of the pumping light Lp is changed, based on the fact that, when the pumping light Lp is modulated with a sine wave or the like to be supplied to the EDF 101, the signal light Ls is amplified in response to a modulation component of the pumping light Lp. Then, FIG. 9 shows a gain characteristic which is converted from the phase characteristic in FIG. 8.

The optical amplification showing the response characteristic of two-steps as described above has a possibility to cause a control error, since a phase deviation occurs in the feedback control of the drive current to be given to the pumping semiconductor laser 102. Therefore, the conventional L-band EDFA has a problem in that a so-called first-order lag feedback control is hard to be performed.

The present invention has been accomplished in view of the above problems and has an object to provide an optical amplifier capable of realizing a good response characteristic in a wide frequency band, even when a population inversion state is formed by a pumping light supplied to an optical amplification medium and an ASE light generated in the optical amplification medium.

SUMMARY OF THE INVENTION

In order to achieve the above object, there is provided an optical amplifier according to the present invention comprising: an optical amplification medium doped with a rare-earth element; and a pumping light supply section that supplies a pumping light to the optical amplification medium, in which a population inversion state is formed by the pumping light supplied to the optical amplification medium and an amplified spontaneous emission light generated in the optical amplification medium, wherein a delayed phase matching fiber formed of a first fiber to which a signal light and the pumping light are input through one end thereof and a second fiber whose response speed is relatively higher than that of the first fiber, is used as the optical amplification medium.

In the optical amplifier of the above configuration, when the pumping light from the pumping light supply section is given through the one end of the first fiber to the delayed phase matching fiber as the optical amplification medium, the pumping light is propagated through the first and second fibers sequentially to a direction same as a propagation direction of the signal light, to be absorbed into the rare-earth element which is doped to the fibers. Further, the ASE light is generated in the first and second fibers by the supply of the pumping light to the delayed phase matching fiber. In the distribution of the pumping light and the ASE light in a lengthwise direction in the delayed phase matching fiber, the pumping lights more than the ASE lights exist on the input side while the ASE lights more than the pumping lights exist on the output side. To such distribution, the first fiber whose response speed is relatively low is arranged on the input side where the optical amplification by the pumping light is mainly performed, and the second fiber whose response speed is relatively high is arranged on the output side where the optical amplification by the ASE light is mainly performed, so that the matching of the phase deviation of the optical amplification by the pumping light with the phase deviation of the optical amplification by the ASE light can be achieved. Thus, it becomes possible to realize a good response characteristic in a wide frequency band.

Other objects, features and advantages of the present invention will become apparent from the following explanation of the embodiments, in conjunction with the appended drawings.

DETAILED DESCRIPTION OF THE PREFERRED EMBODIMENTS

Figure 1:
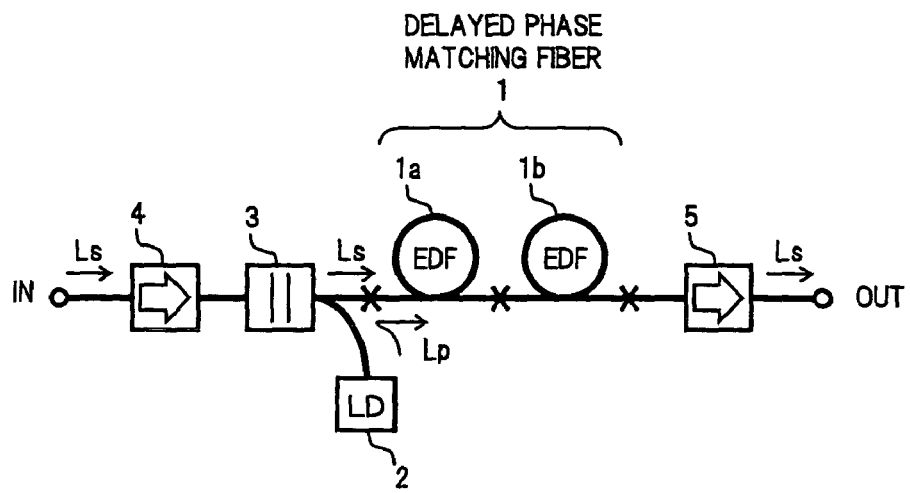
FIG. 1 is a block diagram showing an entire configuration of one embodiment of an optical amplifier according to the present invention.

There will be described embodiments for implementing an optical amplifier according to the present invention, with reference to the accompanying drawings. The same reference numerals denote the same or equivalent parts in all drawings.

FIG. 1 is a block diagram showing an entire configuration of an embodiment of the optical amplifier according to the present invention.

In FIG. 1, the present optical amplifier comprises, for example: a delayed phase matching fiber 1 as an optical amplification medium, in which erbium-doped fibers (EDF) 1a and 1b of two types whose response characteristics are different from each other are connected to each other; a pumping semiconductor laser (LD) 2 and a WDM coupler 3 which supply a pumping light Lp to the delayed phase matching fiber 1; and optical isolators 4 and 5 arranged on both end portions between an input terminal IN and an output terminal OUT.

The delayed phase matching fiber 1 is the optical amplification medium configured such that the EDF (first fiber) 1a whose response speed is relatively low is arranged on the input side thereof and the EDF (second fiber) 1b whose response speed is relatively high is arranged on the output side thereof. The EDF 1a on the input side has a structure in which erbium is doped to the approximate whole of a core surrounded by a clad of an optical fiber, as shown in a cross section view in (a) of FIG. 2. On the other hand, the EDF 1b on the output side has a structure in which the erbium is doped to a center portion of a core, but a core peripheral portion adjacent to the outside of the core, is not doped with the erbium, as shown in a cross section view in (b) of FIG. 2. Note, in FIG. 2, erbium doped regions are shown by hatched lines. The lengths of the EDFs 1a and 1b are previously set according to a distributed condition of the pumping lights Lp and ASE lights in a lengthwise direction of the delayed phase matching fiber 1 as described later, and one ends thereof are connected to each other via a fusion splice, a connector or the like. Further, an input end (the other end of the EDF 1a) of the delayed phase matching fiber 1 is connected to a port of the WDM coupler 3, through which a signal light Ls and the pumping light Lp are output, and an output end (the other end of the EDF 1b) of the delayed phase matching fiber 1 is connected to an input port of the optical isolator 5 on the output side.

The pumping semiconductor laser 2 is a typical pumping light source generating the pumping light Lp of required wavelength (for example, 0.98 μm, 1.48 μm or the like) capable of pumping the erbium within the EDFs 1a and 1b. The pumping light Lp generated in the pumping semiconductor laser 2 is sent to the WDM coupler 3.

The WDM coupler 3 multiplexes the pumping light Lp from the pumping semiconductor laser 2 on the signal light Ls given thereto from the input terminal IN via the optical isolator 4, to give the multiplexed light to the EDF 1a of the delayed phase matching fiber 1. In the present optical amplifier, there is applied a forward pumping configuration in which the signal light Ls and the pumping light Lp are propagated in the same direction.

The optical isolators 4 and 5 are optical passive components each passing a light to only a determined direction. Here, the optical isolator 4 on the input side is arranged between the input terminal IN and the WDM coupler 3, and the optical isolator 5 on the output side is arranged between the delayed phase matching fiber 1 and the output terminal OUT. Note, in the case where the present optical amplifier is operated by a relatively low gain, it is possible to omit these optical isolators 4 and 5.

Next, there will be described an operation of the present embodiment.

In the present optical amplifier, when the signal light Ls of L-band is given to the input terminal IN, this signal light Ls is sent to the delayed phase matching fiber 1 via the optical isolator 4 and the WDM coupler 3. The pumping light Lp generated in the pumping semiconductor laser 2 is given to the delayed phase matching fiber 1 from the EDF 1a side via the WDM coupler 3, and the pumping light Lp is propagated through the EDF 1a and the EDF 1b sequentially to be absorbed, so that the erbium within the EDFs 1a and 1b is pumped. Further, in the EDFs 1a and 1b pumped by the pumping light Lp, the amplified spontaneous emission light (ASE light) of 1.55 μm band is generated, to be reabsorbed as the pumping light.

Figure 3:
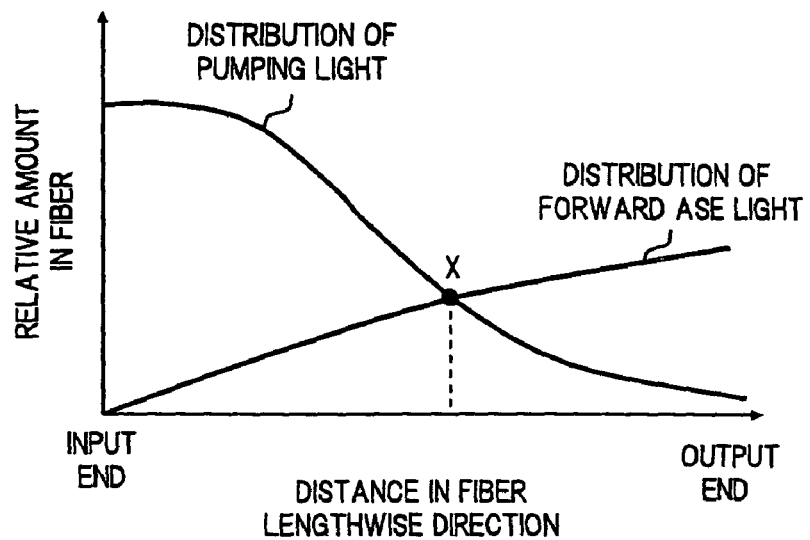
FIG. 3 is a diagram showing an example of the relative distribution between pumping lights and ASE lights, which exist in the delayed phase matching fiber.

At this time, considering the relative distribution of the pumping lights Lp and the ASE lights, which exist in the delayed phase matching fiber 1, in a fiber lengthwise direction, as shown in FIG. 3 for example, since the power of the pumping light Lp is high in the vicinity of the input end of the delayed phase matching fiber 1, the pumping lights Lp more than the ASE lights exist on the input side, and are decreased as approaching the output end of the delayed phase matching fiber 1. On the other hand, the ASE lights exist over the approximate whole of the delayed phase matching fiber 1. However, in comparison with the relative distribution of the pumping lights Lp, the ASE lights more than the pumping lights Lp exist on the output side of the delayed phase matching fiber 1. Based on such a distribution difference, it can be considered that the total length of the delayed phase matching fiber 1 in the lengthwise direction is divided into a range where the pumping light Lp mainly contributes to the optical amplification and a range where the ASE light mainly contributes to the optical amplification. To be specific, as a position of a boundary dividing the above respective ranges, it is possible to set a point X at which a curve indicating the distribution of the pumping lights Lp and a curve indicating the distribution of the ASE lights intersects with each other in FIG. 3, or a point in the vicinity of the point X.

As described above, since the optical amplification by the absorption of the pumping light Lp has the high response speed, while the optical amplification by the re-absorption of the ASE light has the low response speed, a delayed phase difference occurs in the optical output power in the case where a single EDF is used as in a conventional configuration. In order to reduce the delayed phase difference, it becomes effective to apply an optical amplification medium whose response speed is relatively low to the range where the pumping light Lp mainly contributes to the optical amplification, and to apply an optical amplification medium whose response speed is relatively high to the range where the ASE light mainly contributes to the optical amplification. Therefore, in the present embodiment, the EDF 1a in which the erbium is doped to the approximate whole of the core to reduce a relative response speed thereof, is used as the optical amplification medium for the range of from the input end of the delayed phase matching fiber 1 to a position corresponding to the above intersection point X shown in FIG. 3, and the EDF 1b in which the erbium is doped to the center portion of the core to increase a relative response speed thereof, is used as the optical amplification medium for the range of from the point corresponding to the above intersection point X to the output end of the delayed phase matching fiber 1.

Here, the response characteristic of the EDF will be described in detail.

Generally, it has been known that the response speed of the EDF is changed according to the energy density in the fiber. This energy density is one of parameters representing the EDF structure, and can be expressed in accordance with the following equation (1).

$$\Psi = \frac{4}{\pi d^2}\left\{1 - \exp\left(-\frac{2d^2}{\omega^2}\right)\right\} \quad (1)$$

Here, $\Psi$ is the energy density, d is a doping diameter of the erbium and ω is a mode field diameter.

Figure 2:
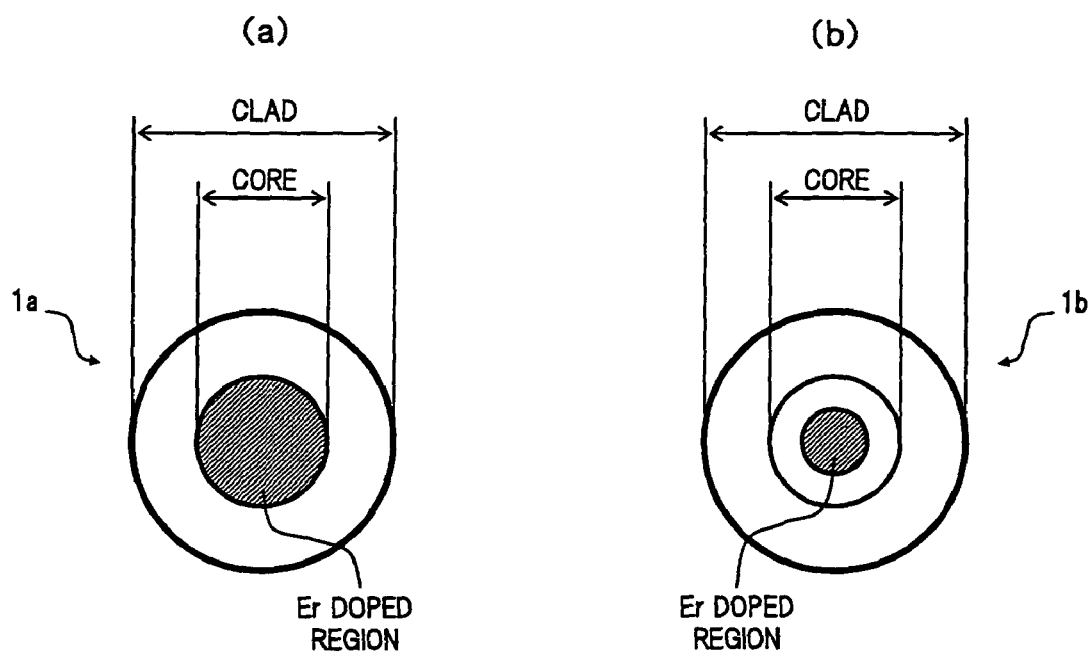
FIG. 2 is a cross section view showing a structural example of a delayed phase matching fiber used in the embodiment.

It is understood from the above equation (1) that the energy density $\Psi$ in the EDF is changed according to the erbium doping diameter d or the mode field diameter ω. To be specific, if the erbium doping diameter d is narrowed, since the energy density to the unit erbium doping volume is increased, the response speed of the EDF is increased. Further, similarly to this, even if the mode field diameter ω is narrowed, the response speed of the EDF is increased. Therefore, in the present embodiment, as shown in FIG. 2, the erbium doping diameter of the EDF 1b on the output side is narrower than the erbium doping diameter of the EDF 1a on the input side, so that the relative response speed in the EDF 1b on the output side is higher than that in the EDF 1a on the input side.

Figure 4:
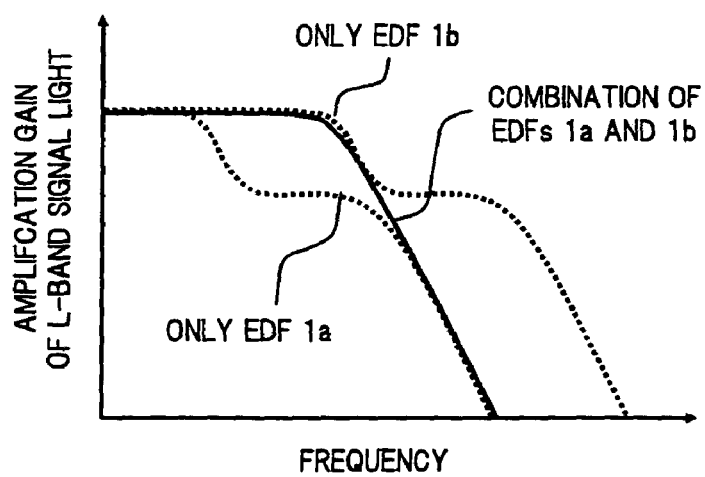
FIG. 4 is a diagram showing an example of a frequency response characteristic obtained in the embodiment.
Figure 9:
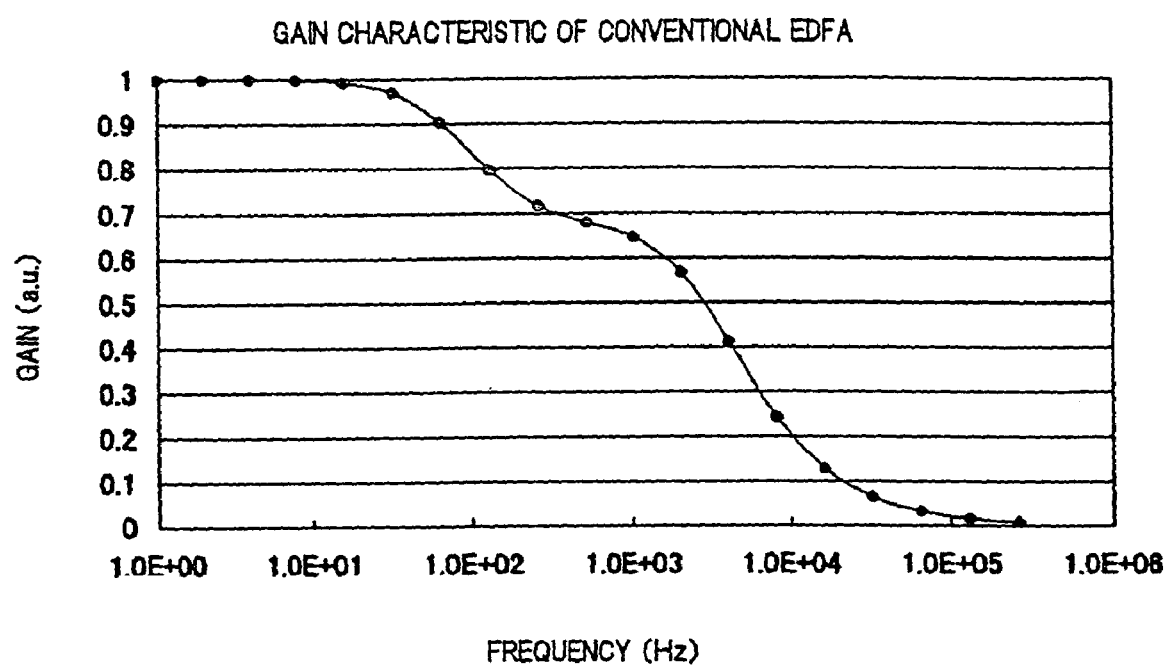
FIG. 9 is a diagram showing a gain characteristic to the frequency in the conventional EDFA.

Accordingly, in the present optical amplifier, for the lengthwise direction of the delayed phase matching fiber 1, the EDF 1a whose erbium doping diameter is widened is used so that the relative response speed is suppressed, in the input side range where the optical amplification is mainly performed by the pumping light Lp, whereas the EDF 1b whose erbium doping diameter is narrowed is used so that the relative response speed is increased, in the output side range where the optical amplification is mainly performed by the ASE light. Thus, the response speed in the entire delayed phase matching fiber 1 approaches a uniform state. As a result, since it is possible to achieve the matching of the phase deviation in the optical amplification by the pumping light Lp with the phase deviation in the optical amplification by the ASE light, it becomes possible to obtain a fixed delay time over a wide frequency band, as shown by the solid line in FIG. 4 for example. Note, each of response characteristics shown by broken lines in FIG. 4 shows one example in which the signal light of L-band is amplified using a single EDF 1a or a single EDF 1b. Accordingly, since a frequency response characteristic of two-steps as shown in FIG. 9 is avoided, it becomes possible to easily realize a feedback control of the pumping semiconductor laser 2.

Figure 5:
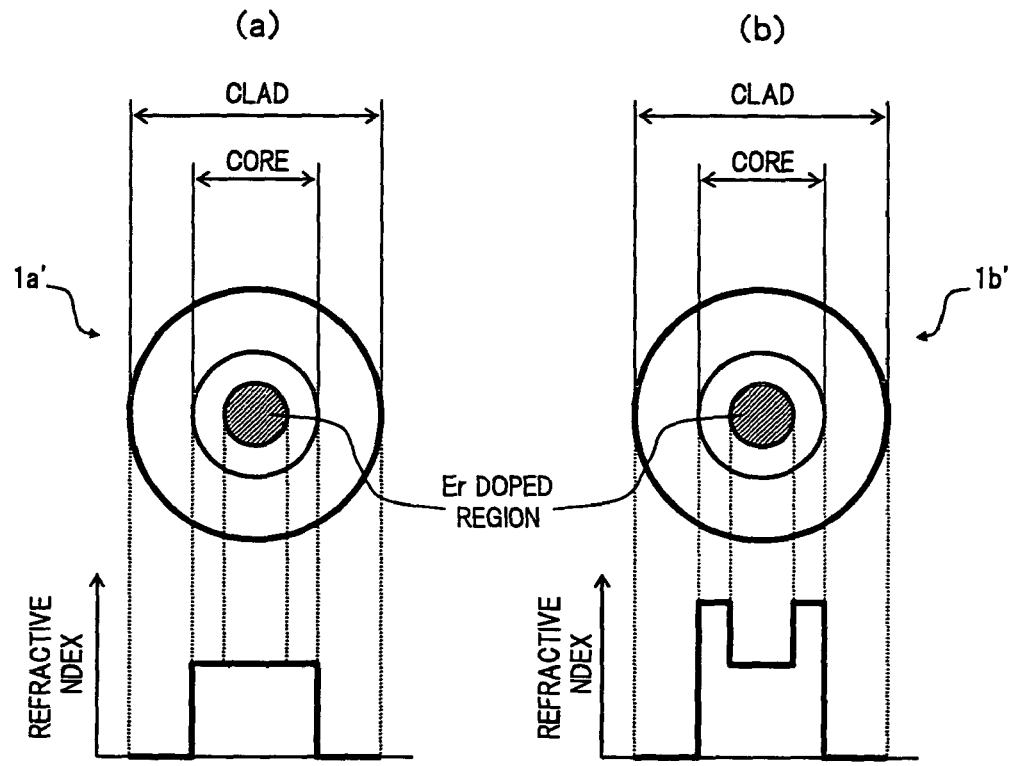
FIG. 5 is a cross section view showing another structural example of the delayed phase matching fiber used in the embodiment.

In the above embodiment, the erbium doping diameters are made different from each other so that the response speeds of the EDFs 1a and 1b are relatively different from each other. However, the present invention is not limited to the above, and as shown in FIG. 5 for example, the configuration may be such that a difference is made on refractive index profiles in cores of EDFs 1a' and 1b' to make the mode field diameters different from each other, so that response speeds of the EDFs 1a' and 1b' are relatively different from each other. To be specific, in one example of FIG. 5, in optical fibers having the same erbium doping diameters, in which the erbium is doped to the center portions of cores thereof, the optical fiber designed so that the refractive index profile thereof is substantially constant over the entire core is used as the EDF 1a' on the input side, whereas the optical fiber designed whose refractive index profile is designed so that the refractive index of a core peripheral portion to which the erbium is not doped becomes higher than the refractive index of the erbium doped region, is used as the EDF 1b' on the output side. In order to change the refractive index of each of the core center portion and the core peripheral portion, the doping concentration of ion, for example aluminum (Al), germanium (Ge) or the like, to be doped to the fiber for adjusting the refractive index, may be made different in each portion. Thus, since the mode field diameter is narrowed by increasing the refractive index of the core peripheral portion, the response speed of the EDF1b' becomes higher than that of the EDF1a'. As a result, it becomes possible to achieve a function and an effect similar to those in the case where the erbium doping diameters are made different from each other.

Next, there will be described a specific application example of the optical amplifier according to the above embodiment.

Figure 6:
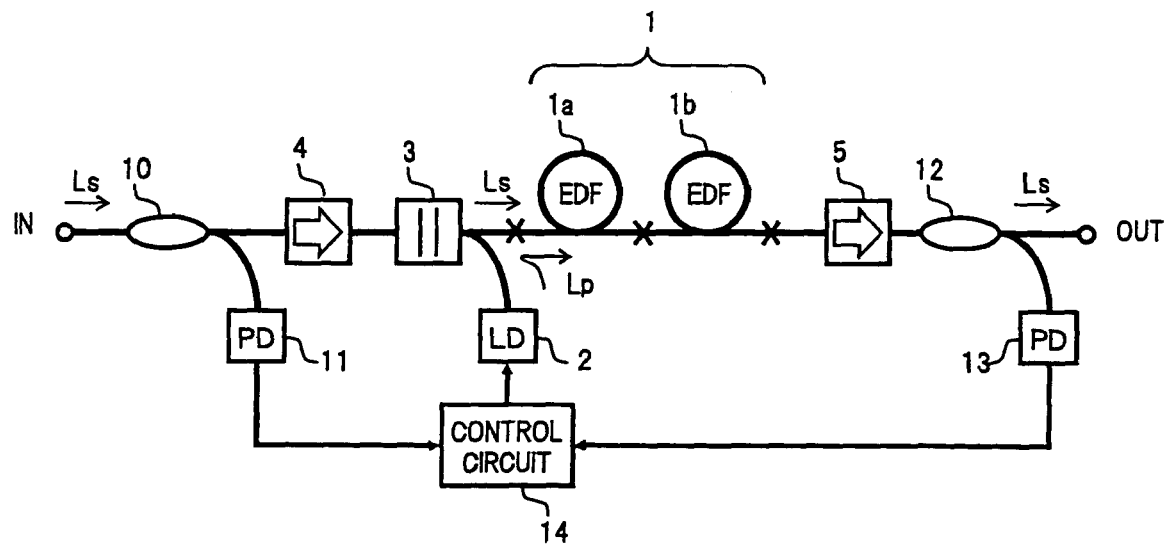
FIG. 6 is a block diagram showing a configuration of a specific application example of the embodiment.
Figure 7:
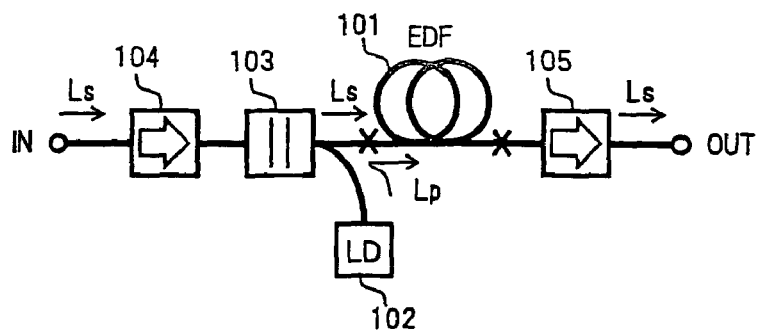
FIG. 7 is a block diagram showing a basic configuration of a conventional EDFA.
Figure 8:
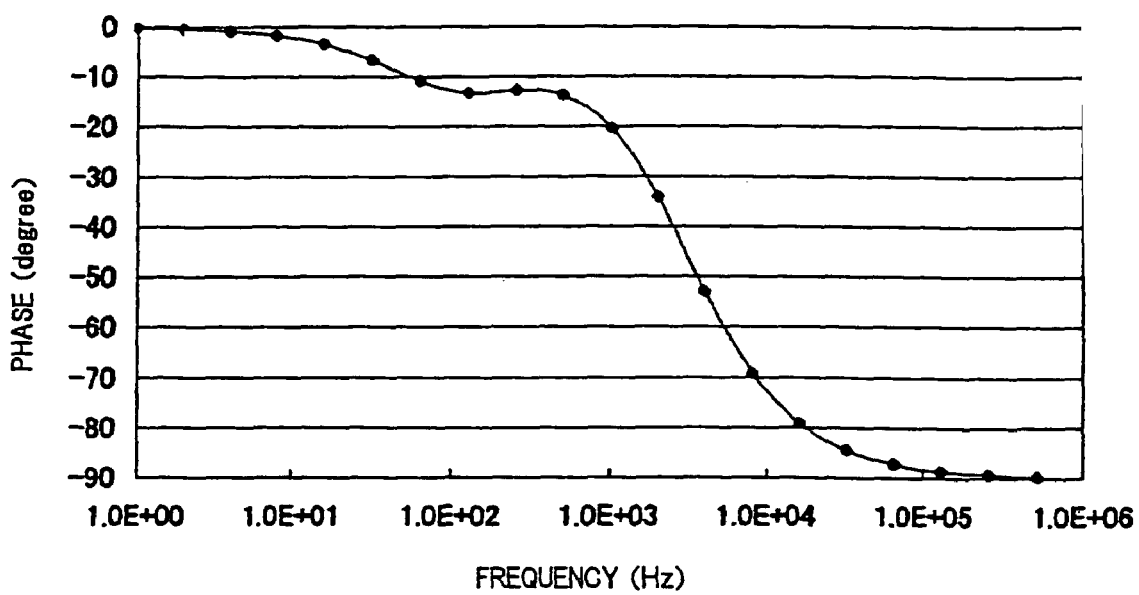
FIG. 8 is a diagram showing a phase characteristic to a frequency in the conventional EDFA.

FIG. 6 is a block diagram showing a configuration of an optical amplifier according to the application example.

The optical amplifier shown in FIG. 6 is configured such that there are disposed in the configuration of the embodiment shown in FIG. 1, an optical coupler 10 and a light receiver (PD) 11 for monitoring the input light power, an optical coupler 12 and a light receiver (PD) 13 for monitoring the output light power, and a control circuit 14 which feedback controls a driving condition of the pumping semiconductor laser 2 based on the output and input light powers monitored by the respective light receivers 11 and 13, so that a gain in the present optical amplifier becomes constant. The configuration other than the above is similar to that of the embodiment shown in FIG. 1, and accordingly, the description thereof is omitted here.

In the optical amplifier of the above configuration, the drive current to be given to the pumping semiconductor laser 2 is feedback controlled in accordance with a control signal from the control circuit 14, so that a so-called AGC is performed. This AGC is performed based on a monitoring result of the output light indicating the good response characteristic in the wide frequency band as shown in FIG. 4, and not based on a monitoring result of the output light indicating the frequency response characteristic of two-steps as in the conventional technology. Therefore, it becomes possible to perform the high accurate control.

Note, in the above application example, there has been shown the configuration of the optical amplifier to which the AGC is applied. However, it is possible to achieve an effect same as that in the AGC, even if the optical amplifier is configured to perform a so-called ALC in which the pumping semiconductor laser 2 is feedback controlled so that, for example a level of the output light monitored by the light receiver 13 becomes constant.

Further, in the above embodiment and the application example thereof, the description has been made on the optical amplifier using the optical fiber doped with the erbium. However, the present invention is not limited to this, and accordingly, it is possible to use an optical fiber doped with a rare-earth element other than the erbium, as the optical amplification medium. The pumping light applied in this case has a required wavelength which is absorbed into the rare-earth element doped to the optical fiber, to enable the formation of the population inversion.

Moreover, the description has been made on the case where the signal light of L-band is amplified. However, the present invention is not limited to the optical amplifier for L-band. Even in an optical amplifier having an amplification band in the other wavelength band, if such an optical amplifier has a forward pumping configuration in which a population inversion state is formed by the pumping light supplied to the optical amplification medium and the ASE light generated in the optical amplification medium, it is possible to achieve an effect same as that in the above case by applying the present invention.

INDUSTRIAL APPLICABILITY

According to the present invention, in an optical amplifier of forward pumping type in which a population inversion state of an optical amplification medium is formed by a pumping light and an ASE light, a delayed phase matching fiber in which a first fiber whose response speed is relatively low is arranged on the input side and a second fiber whose response speed is relatively high is arranged on the output side, is used as an optical amplification medium. Thus, since a good response characteristic can be obtained in a wide frequency band and also a feedback control of a pumping light can be performed with high accuracy, the large industrial applicability can be achieved.

What is claimed is:

1. An optical amplifier comprising:
    a delayed phase matching fiber comprising:
        a first rare earth doped fiber having a first core, and a first clad that surrounds the first core, and
        a second rare earth doped fiber having a second core that is rare earth element doped, a third core that surrounds the second core, and a second clad which surrounds the third core,
        wherein the first and second rare earth doped fibers are arranged so that pumping light and signal light travel through the first rare earth doped fiber and then through the second rare earth doped fiber in the same direction and thereby cause the signal light to be optically amplified, wherein the first core has a constant refractive index, the third core has a higher refractive index than the second core, and the first rare earth doped fiber has the same rare earth element doping diameter as the second core.

2. An optical amplifier according to claim 1, wherein the first and second rare earth doped fibers are erbium doped fibers.

3. An optical amplifier according to claim 1, wherein
    amplified spontaneous emission is generated in the first and second rare earth doped fibers,
    the first rare earth doped fiber is arranged in a range where the pumping light more than the amplified spontaneous emission exist in a lengthwise direction of the delayed phase matching fiber, and
    the second rare earth doped fiber is arranged in a range where the amplified spontaneous emission more than the pumping light exists in a lengthwise direction of the delayed phase matching fiber.

4. An optical amplifier according to claim 2, wherein
    amplified spontaneous emission is generated in the first and second rare earth doped fibers,
    the first rare earth doped fiber is arranged in a range where the pumping light more than the amplified spontaneous emission exist in a lengthwise direction of the delayed phase matching fiber, and
    the second rare earth doped fiber is arranged in a range where the amplified spontaneous emission more than the pumping light exists in a lengthwise direction of the delayed phase matching fiber.

5. An optical amplifier according to claim 1, wherein a diameter of the second rare earth doped fiber is smaller than a diameter of the first rare earth doped fiber.

6. An optical amplifier according to claim 4, wherein a diameter of the second rare earth doped fiber is smaller than a diameter of the first rare earth doped fiber.

* * * * *